(12) United States Patent
Chang et al.

(10) Patent No.: US 7,349,033 B2
(45) Date of Patent: Mar. 25, 2008

(54) SYSTEMS AND METHODS FOR CORRECTING COLOR PHASE ERROR IN VIDEO SYSTEMS

(75) Inventors: Weider Peter Chang, Hurst, TX (US); Ramesh M. Chandrasekaran, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 465 days.

(21) Appl. No.: 11/134,985

(22) Filed: May 23, 2005

(65) Prior Publication Data

US 2006/0262225 A1 Nov. 23, 2006

(51) Int. Cl.
*H04N 9/66* (2006.01)
*H04N 9/78* (2006.01)

(52) U.S. Cl. .................. 348/640; 348/666; 348/620

(58) Field of Classification Search ........ 348/638–641, 348/663–670, 620, 621, 653, 654
See application file for complete search history.

(56) References Cited

U.S. PATENT DOCUMENTS

| | | | |
|---|---|---|---|
| 4,261,009 A * | 4/1981 | Tomimoto et al. .......... 348/647 |
| 4,306,247 A * | 12/1981 | Tomimoto et al. .......... 348/605 |
| 4,349,833 A | 9/1982 | Clarke |
| 4,689,664 A * | 8/1987 | Moring et al. ............. 348/639 |
| 5,218,435 A | 6/1993 | Lim et al. |
| 5,335,074 A | 8/1994 | Stec |
| 5,369,448 A * | 11/1994 | Lee ..................... 365/185.13 |
| 5,430,500 A | 7/1995 | Hoshino et al. |
| 5,523,850 A | 6/1996 | Kanda et al. |
| 5,526,060 A | 6/1996 | Raby |
| 5,926,220 A | 7/1999 | Linzer |
| 6,055,024 A | 4/2000 | DiMeo et al. |
| 6,459,457 B1 | 10/2002 | Renner et al. |
| 2004/0174464 A1 | 9/2004 | MacInnis et al. |

\* cited by examiner

*Primary Examiner*—M. Lee
(74) *Attorney, Agent, or Firm*—Wade J. Brady, III; Frederick J. Telecky, Jr.

(57) ABSTRACT

Systems and methods are provided for correcting color phase error in a video decoder system. A demodulator system demodulates the composite input signal and the at least one delayed signal to produce sets of baseband chroma components based on a phase correction value. Color phase correction logic determines the phase correction value for the demodulator system based upon characteristics of the baseband chroma components associated with a series of at least two consecutive frames.

21 Claims, 4 Drawing Sheets

SYSTEMS AND METHODS FOR CORRECTING COLOR PHASE ERROR IN VIDEO SYSTEMS

TECHNICAL FIELD

The present invention relates generally to electrical circuits, and more particularly to systems and methods for correcting color phase error in a video system.

BACKGROUND

A video display operates by displaying video images in response to a composite video signal received from a video source. The composite video signal comprises both luminance (luma) and chrominance (chroma) information. The luma portion contains the brightness, or black-and-white information for a given series of pixels, and the chroma portion contains the color information for the series of pixels. There are several standards for video signals commonly in use today, one being the National Television Standards Committee (NTSC) standard, which is used widely in the United States and Japan. Another standard for video signals is the Phase Alternating Lines (PAL) standard, which is widely used in Europe. There are several key differences between NTSC and PAL in the way how the chroma portion of the composite signal is encoded. In NTSC, the chroma portion of a composite signal shifts in phase by one hundred eighty degrees between corresponding pixels on consecutive lines and frames. In PAL, the chroma component of the composite signal shifts in phase by approximately 270 degrees under the same condition.

A number of functions in a video display rely on the accurate detection of motion within the signal, such as noise reduction and deinterlacing. Another application of motion detection is the separation of luma and chroma information within a signal. In some video transmission standards, chroma information within a composite video signal can be carried within the same frequency band as luma information. The chrominance signal is separated out of the composite video signal and decoded, along with the normal intensity signal, to determine the color content of the input signal. A problem can arise when portions of the luma signal intrude into or near a frequency band associated with a chroma subcarrier. With 2-D comb filter, a portion of the intruding portion of the luma signal can be demodulated and output from the video decoder along with the chroma signal, resulting in a display of false color. Similarly, the chroma may also cause cross luma (e.g., dot crawls or hanging dots) in the luma decoded and output from the decoder. All the above mentioned artifacts are a result of incomplete separation of luma and chroma signals from the composite video.

The complete separation of luma and chroma, thus the elimination of false color and dot crawls can be achieved with better accuracy by comb filtering the signal across three dimensions (e.g., within a frame as well as successive frames), but this technique works and will be applied only if there is little or no motion in the video during this time. The correct application of 3-D comb filtering relies on accurate motion detection. Thus, by detecting the lack of motion across frames, the color artifacts within the composite video signal can be reduced by applying a 3-D comb filter. Unfortunately, in certain video formats such as PAL, motion detection is susceptible to color phase error. The color phase error can deceive a motion detection algorithm to mis-detect motion with a sequence of perfectly still images, degrading the quality of the video display.

SUMMARY

In accordance with an aspect of the present invention, a video decoder system is provided. A demodulator system demodulates the composite input signal and the at least one delayed signal to produce sets of baseband chroma components based on a phase correction value. Color phase correction logic determines the phase correction value for the demodulator system based upon characteristics of the baseband chroma components associated with a series of at least two consecutive frames.

In accordance with another aspect of the present invention, a method is provided for correcting phase error in a video decoder system. An input signal is demodulated to provide a first set of chroma components, representing a first frame, and a second set of chroma components, representing a second frame, for each of a plurality of pixels. A first vector is generated from the first set of chroma components and a second vector is generated from the second set of chroma components. A subset of pixels is selected according to at least one selection criteria. An angular difference is determined between the first vector and the second vector for each of the selected subset of pixels. The determined angular differences are then summed.

In accordance with yet another aspect of the present invention, a video system is provided. A demodulator system demodulates a composite video signal to produce a first set of chroma components, representing a first frame, and a second set of chroma components, representing a second frame. The demodulator can also demodulate the composite video signal to produce a third set of chroma components, representing a third frame. Color phase correction logic calculates a phase correction value for the demodulator system based upon characteristics of at least two sets of the chroma components. A video display, visible to a user, displays a signal represented by one or combination of at least two of the three sets of chroma components and an associated luma component.

BRIEF DESCRIPTION OF THE DRAWINGS

The foregoing and other aspects of the present invention will become apparent to those skilled in the art to which the present invention relates upon reading the following description with reference to the accompanying drawings.

DETAILED DESCRIPTION

Figure 1:
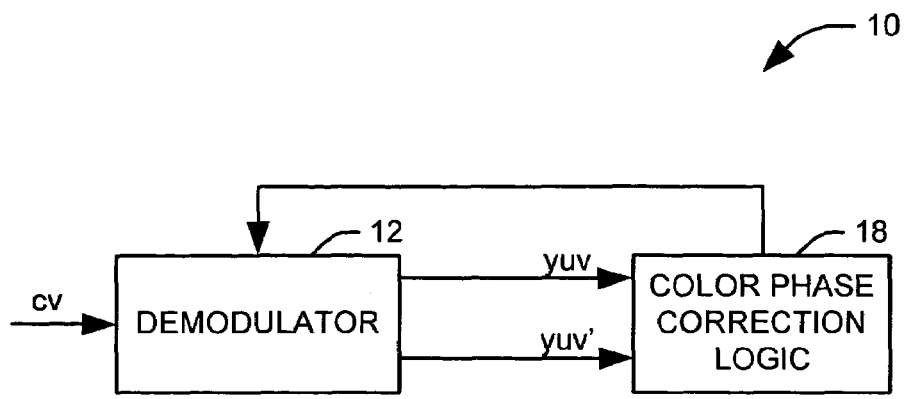
FIG. 1 illustrates a system for correcting phase error in a composite video signal in accordance with an aspect of the present invention.

FIG. 1 illustrates a system 10 for correcting phase error in a composite video signal, cv, in accordance with an aspect of the present invention. The illustrated system can be utilized to detect and remove phase error attributable to in video display systems in which it is difficult to accurately remove the phase error through simple cancellation. For example, the composite video signal can comprise a luma component, Y, and two chroma components, U and V. The composite video signal can include a degree of phase error in the chroma signals due to mismatches at the signal source between the reference color subcarrier signal and the carrier signal that actually modulates the active signal. The phase error can also be due to mismatches at the display between the reference signal used to modulate the chroma components and a reference signal used to demodulate the composite signal.

In an NTSC signal, the phase error causes the color vector formed by the chroma components U and V to shift by an angle defined by the color phase error. All pixels in all frames are shifted by the same amount. The color phase error appears to be a constant hue shift in all colors. Since the shift is constant, it has no detrimental effects on the motion detection, which computes the amount of motion associated with each pixel based on the difference in the chroma components among the pixel itself and its neighbors in two nearest adjacent frames. The difference will not vary if the chroma components of all the pixels change by a constant hue angle. In a sense, the color phase error cancels out itself.

In PAL, the situation is more complicated, as the hue change due to color phase error is not constant as in NTSC. Instead, the direction of the hue change, or equivalently the sign of the V component of the difference in chroma components changes between adjacent lines of pixels and between corresponding lines of pixels on adjacent frames. This is a result of a chroma encoding technique that is unique to PAL video systems, referred to as a PAL switch (or V-switch), in which the sign of the V component is inverted very other line. This PAL switch tends to complicate the detection and removal of the phase error when the video display implements motion detection and phase correction between video frames. Since the error due to color phase error cannot be easily cancelled out in a PAL system, the motion detection system can register as false motion, introducing error into the processing of the composite video signal.

In accordance with an aspect of the invention, the composite video signal, which comprises a series of video frames, is provided to a demodulator system 12. The demodulator system 12 demodulates the composite video signal using an associated reference signal to produce a first set of YUV components and at least one set of delayed YUV' components with each set of components representing a given frame within the composite video signal. The demodulator system can include an appropriately positioned delay element for providing the delayed YUV' components. For example, the delay element can be utilized to the delay the composite video signal by increments of one frame to produce one or more delayed signals, cv', representing corresponding video data for one or more frames within the composite signal. That is, the delay element can be utilized to the delay the composite video signal to produce a second set of chroma components, representing a second frame, and to produce a third set of chroma components, representing a third frame. The delayed signals can then be demodulated to produce the corresponding delayed YUV' components for each frame. Alternatively, the demodulated YUV component can be delayed at the delayed elements to produce one or more delayed sets of YUV' components.

The first and second baseband chroma signals are provided to color phase correction logic 18 associated with the system. The color phase correction logic 18 calculates a phase correction value for the demodulator system 12 based upon characteristics of the baseband chroma signals. For example, the color phase correction logic 18 can determine a difference in angle between vectors defined by the sets of chroma components associated with the signal. This difference can be summed for a selected subset of pixels associated with a given frame to calculate a phase correction value for a given frame. The determined phase correction value can be provided to the demodulator system 12 to correct the phase associated with the chroma components of the signals. Accordingly, the color phase error can be corrected in a system sensitive to interframe motion despite the inversion of the V chroma component each line.

Figure 2:
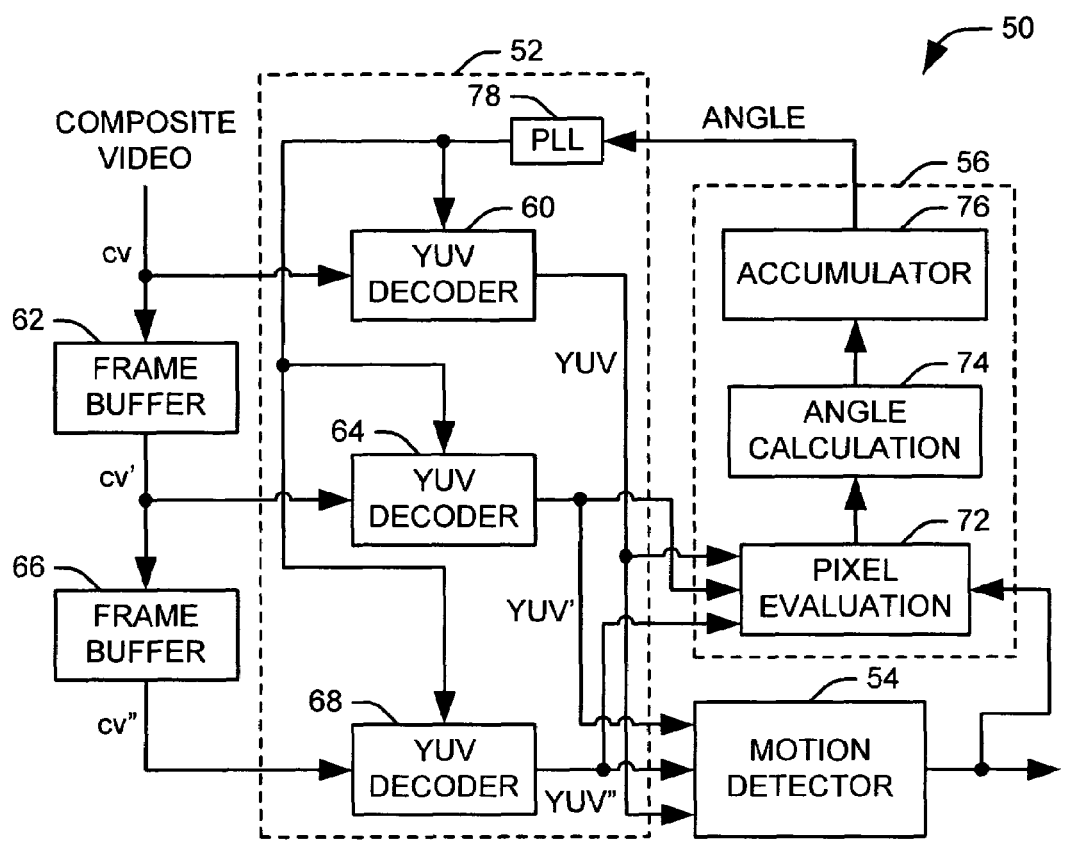
FIG. 2 illustrates a video decoder system in accordance with an aspect of the present invention.

FIG. 2 illustrates a video decoder system 50 in accordance with an aspect of the present invention. The illustrated video decoder system 50 includes a demodulation system 52 that provides three sets of YUV components representing corresponding pixels for respective frames of the composite video signal. These YUV components are provided to a motion detector 54 that evaluates an amount of motion, if any, experienced in the pixels between frames. The YUV components are also provided to color phase correction logic 56 that corrects for phase errors in the chroma portion of the composite signal.

The system 50 receives a composite video signal, cv, at a first YUV video decoder 60 within the demodulation system 52. The YUV video decoder 60 extracts the two chroma components, U and V, and the luma component, Y comprising the composite video signal using respective reference signals. For example, sine and cosine reference signals can be provided for each line of the composite video, cv and cv'. It will be appreciated that at least one of the sine and cosine reference signals can invert in phase each lien in accordance with the PAL format. These video components, representing a first video frame, are provided to the motion detector 54 and the color phase correction logic 56.

The composite video signal is also provided to a first frame buffer 62. The first frame buffer 62 delays the composite video signal by one frame to provide a first delayed composite video signal, cv'. The first delayed composite signal cv' is provided to a second YUV video decoder 64. The YUV video decoder 64 extracts the two chroma components, U and V, and the luma component, Y comprising the first delayed composite video signal using respective reference signals. These video components YUV', representing a second video frame, are provided to the motion detector 54 and the color phase correction logic 56.

The first delayed composite video signal cv' is also provided to a second frame buffer 66. The second frame buffer 66 delays the composite video signal by one frame to provide a second delayed composite video signal representing a third frame, cv". The second delayed composite signal is provided to a third YUV video decoder 68. The YUV video decoder 68 extracts the two chroma components, U and V, and the luma component, Y comprising the second delayed composite video signal using respective reference signals. These video components YUV", representing a third video frame, are provided to the motion detector 54 and the color phase correction logic 56.

The color phase correction logic 56 calculates a phase correction value for the demodulator system based upon characteristics of at least two of three sets of the baseband chroma components UV, UV', and UV". The color phase correction logic 56 can also employ an associated luma component for the respective frames. As a result, the video decoder system can generate a phase corrected video signal from one set or a combination of at least two of the three sets of chroma components and an associated luma component, such as described herein.

The YUV, YUV', and YUV" components from the demodulator system 52 are received at a pixel evaluation component 72 in the color phase correction logic 56. The pixel evaluation component 72 determines if the YUV data between consecutive frames (e.g., the first and second frames) indicates motion in the pixel between frames according to a variety of criteria. For example, it can be determined if the luma or chroma properties of the pixel change by a margin greater than a threshold value between pixels. Such a change would indicate that the pixel is experiencing motion between the two frames. Similarly, it can be determined if the chroma values for a given frame are sufficiently large for an accurate evaluation of the chroma values for the pixel. It will be appreciated that the pixel evaluation component 72 can receive input from the motion detection 54 to facilitate the evaluation of the pixels by altering the pixel evaluation component to detected motion between the frames.

In one implementation, a vector, comprising a magnitude and an angle, can be constructed for each of the chroma components, U and V at each pixel. These angles can be compared to ensure that they are approximately equal in magnitude. Any significant difference in magnitude would indicate motion in the chroma component of the signal. The combined magnitude of the vectors can also be compared to a threshold value, with the pixel being rejected if the sum is less than the threshold value. The luma components of the signals can also be compared to detect motion. Similarly, it can be determined if the difference in the phase angles of the vectors exceeds a threshold value, such that the difference is too large to be explained by phase error. It will be appreciated that these threshold values can be made programmable by a user to allow the performance of the pixel evaluation component to be fine tuned.

Once it has been determined that a pixel is suitable for evaluation, the pixel can be provided to an angle calculation component 74. The angle calculation component 74 determines a color phase error between the two frames. For example, a magnitude and phase angle can be calculated values of the chroma components for each frame can be treated as the elements a two-dimensional vector for the frame. The color phase error can be calculated as a difference in angle between the vector associated with the first frame and the vector associated with the second frame.

Once this angle has been calculated, it is provided to an accumulator 76 that sums the angle values over the course of a line. The accumulated value at the end of each line is provided to a register at the demodulator system 52. At the start of each new frame, the accumulated angle is used to drive a phase locked loop (PLL) 78. The PLL 78 generates an error correction signal in the form of a phase offset for the demodulator system 52. This phase offset is provided to each of the YUV decoders 60, 64, and 68 to compensate for the determined color phase error for the next frame. By using the accumulated sum of the difference angles, artifacts caused by motion or noise can average out, allowing a reasonable estimate of the phase error to be determined. Over time, the PLL 78 converges, forcing the phase error to zero.

Figure 3:
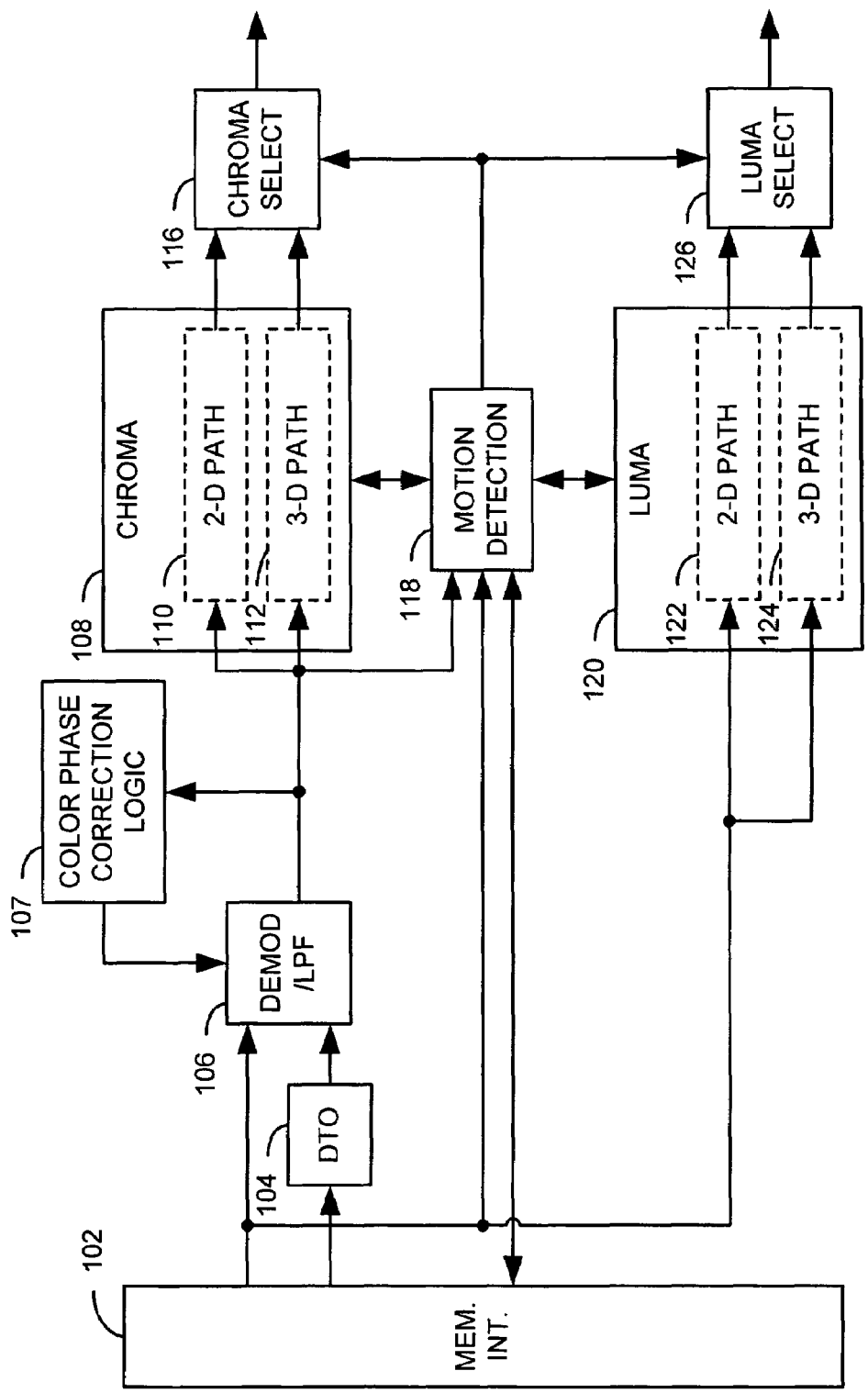
FIG. 3 illustrates an exemplary implementation of a motion detector in accordance with an aspect of the present invention in a luma-chroma separation system.

FIG. 3 illustrates an exemplary implementation of a motion detector in accordance with an aspect of the present invention in a luma-chroma separation system 100. It will be appreciated, however, that a motion detector in accordance with the present invention can be utilized for a variety of functions within a video display system, including noise reduction and deinterlacing. In accordance with an aspect of the invention, the luma-chroma separation system 100 incorporates a memory interface 102 that facilitates communication between signals stored in a memory (not shown) and the other components of the luma-chroma separation system 100. The memory interface 102 provides a reference signal to a discrete time oscillator (DTO) 104. The DTO 104 provides sine and cosine reference signals, representing in-phase and quadrature components of the chroma carrier signal, to a demodulator system 106. In a PAL system, one of the reference signals can invert in phase with each line to match the inversion experienced by the V chroma component.

A composite video signal is then provided to the demodulator system 106, and a set of YUV signal components are extracted. The demodulator system 106 can be provided with delayed versions of the composite signal to produce sets of delayed YUV signal components representing additional frames in the video input. The demodulator system is provided to color phase detection logic 107 implemented in accordance with an aspect of the present invention. The color phase detection logic 107 provides a feedback signal to the demodulator system 106 to maintain the system at a desired phase.

The extracted signal set can then be provided to a chroma assembly 108, comprising a 2-D filter path 110 and a 3-D filter path 112. The 2-D filter path 108 includes eliminates extraneous luma information within the chroma signal set by combining lines of video within a given video frame of the baseband chroma signal. Each line output from the 2-D filter path 108 is a linear combination of two or more lines, weighted according to a set of filter coefficients. Similarly, the 3-D filter path 110 eliminates extraneous luma information within the chroma signal set by combining frames, for example consecutive or temporally proximate frames, that contain similar information. Each frame output from the 3-D filter path 110 is a linear combination of two or more frames within the video signal, weighted according to a set of filter coefficients.

The outputs of the 2-D and 3-D paths 110 and 112 are provided to a chroma selector 116. The chroma selector 116 combines the 2-D or the 3-D chroma output for each pixel of video data according to a motion parameter provided by a motion detector 118 in accordance with an aspect of the present invention. In an exemplary implementation, the output of the chroma selector 116 is a weighted average of the 2-D and the 3-D chroma signals A luma assembly 120 comprises a 2-D luma path 122 and 3-D luma path 124 for generating, respectively, a 2-D luma signal and a 3-D luma signal. The luma signal from each path can be generated in a number of ways, including comb filtering of a series of lines or frames within the composite video signal or by utilizing information from the chroma assembly 108 to eliminate extraneous chroma information from the signal. The outputs of the 2-D and 3-D luma paths 122 and 124 are provided to a luma selector 126. The luma selector 126 combines the 2-D or the 3-D luma output for each pixel of video data according to the motion parameter provided by the motion detector 118. For example, the output of the luma selector 126 can be a weighted average of the 2-D and the 3-D luma signals.

Figure 4:
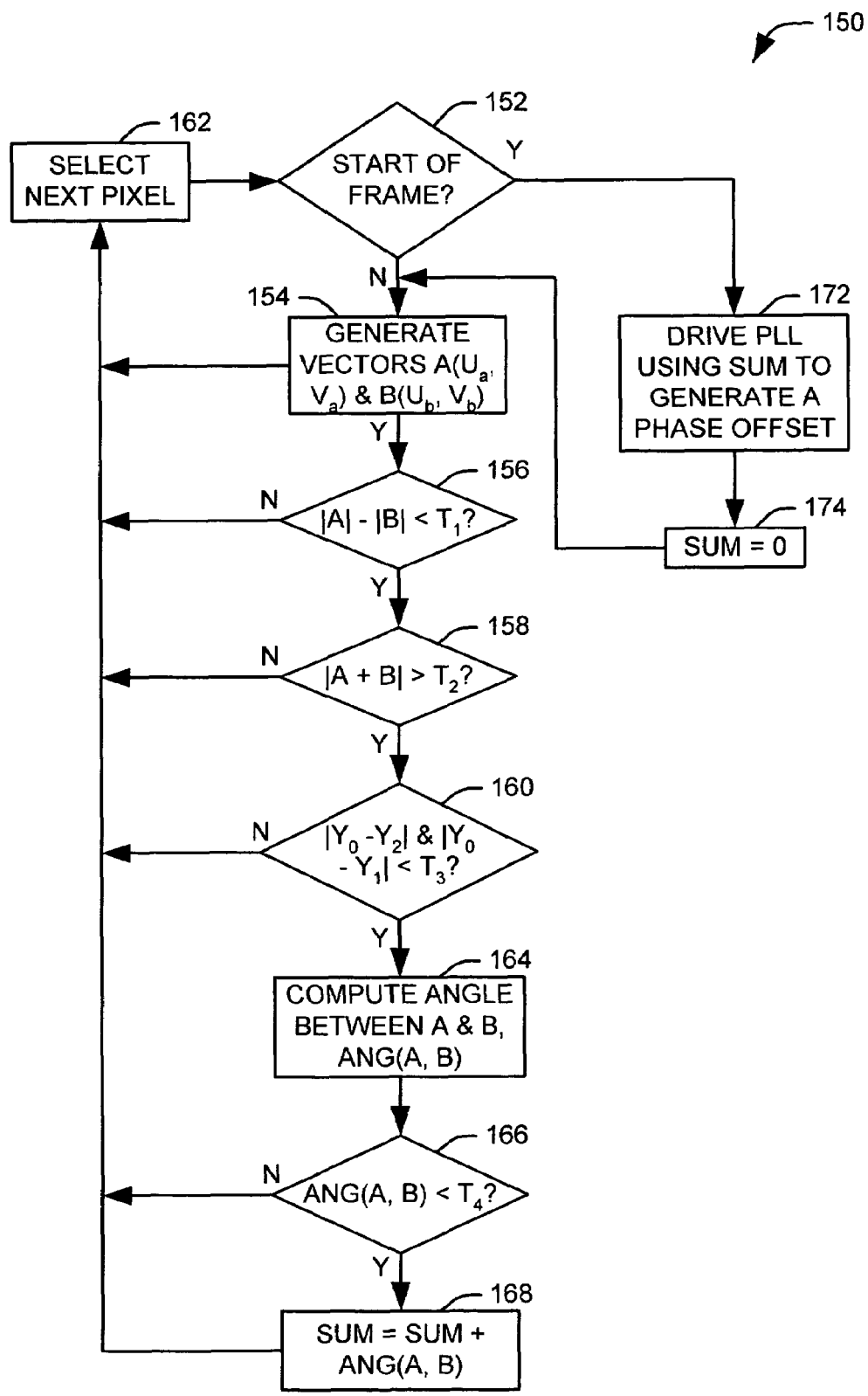
FIG. 4 illustrates a flow diagram representing an exemplary methodology for the color phase correction logic in accordance with an aspect of the present invention.

In view of the foregoing structural and functional features described above, a methodology in accordance with various aspects of the present invention will be better appreciated with reference to FIG. 4. While, for purposes of simplicity of explanation, the methodology of FIG. 4 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 4 illustrates a flow diagram 150 representing an exemplary methodology for the color phase correction logic in accordance with an aspect of the present invention. At 152, it is determined if a pixel to be evaluated, having digital values for respective luma, Y, and chroma, U and V, components for at least two frames, represents the start of the frame. It will be appreciated that while each frame starts on a pixel at a selected position, the position of this start pixel can be arbitrary for a given system. If the pixel does not represent the start of the frame (N), the methodology advances to 154, where vectors, A and B, representing two consecutive video frames, are generated from respective sets of chroma components associated with each frame. Specifically, a first vector, A, can be a two-dimensional vector having as its elements a magnitude and phase angle determined from the values of the U and V chroma components for a first video frame. A second vector, B, can be a two-dimensional vector having as its elements a magnitude and phase angle determined by the values of the U and V chroma components for a second video frame.

Once the vectors A and B are established, the methodology performs a number of comparisons, represented by decision blocks 156, 158, and 160, to determine if the differences between vectors A and B are likely to be caused by motion as opposed to phase error. At 156, it is determined if the vectors are roughly equal in magnitude. Specifically, the difference in magnitude between the vectors is compared to a first threshold, $T_1$, representing a maximum difference expected from a shift in the phase of the chroma components. If the difference in magnitude exceeds the first threshold (N), it is likely that an actual change in the chroma characteristic of the pixel has occurred across frames, and the pixel is excluded from the calculation of the phase correction. Accordingly, the methodology advances to 162, where a next pixel within the video frame is selected for evaluation. The methodology then returns to 152 to evaluate the new pixel.

If the difference in the magnitudes of the vectors is less than the first threshold (Y), the methodology advances to 158, where it is determined if the magnitude of the sum of the vectors exceeds a second threshold, $T_2$. If the summed values exceed the second threshold and other criteria (e.g., 156) are met, the magnitude of each vector is sufficiently large for them to be validly compared. If the magnitude of the sum of the vectors is less than the threshold (N), the pixel is excluded from the calculation of the phase correction. Accordingly, the methodology advances to 162, where a next pixel within the video frame is selected for evaluation. The methodology then returns to 152 to evaluate the new pixel.

If the magnitude of the sum of the vectors exceeds the second threshold (Y), the methodology advances to 160. At 160, the change in the luminance values between frames is examined. Specifically, it is determined if the change in luminescence between the current frame and one or more previous frames is greater than a third threshold, $T_3$. In the illustrated example, the current luma value, $Y_0$, is compared to the luma value for an immediately previous frame, $Y_1$, and the luma value from a frame two frames previous, $Y_2$. If either of the previous luma values, $Y_1$ and $Y_2$, differs from the current luma value, $Y_0$ by more than a third threshold (N), it is likely that an actual change in the luma characteristics of the pixel has occurred across frames, and the pixel is excluded from the calculation of the phase correction. Accordingly, the methodology advances to 162, where a next pixel within the video frame is selected for evaluation. The methodology then returns to 152 to evaluate the new pixel.

If neither of the previous luma values differ from the current luma value by more than a third threshold (Y), the methodology advances to 164, where the difference in the angles, ANG(A, B) represented by vectors A and B is calculated. The difference between the angles is then compared to a fourth threshold, $T_4$, at 166. If the difference is too large, it likely reflects something other than a color phase error, such as signal noise or motion. Accordingly, if the difference exceeds the fourth threshold value (N), the pixel is excluded from the calculation of the phase correction. The methodology advances to 162, where a next pixel within the video frame is selected for evaluation. The methodology then returns to 152 to evaluate the new pixel.

If the difference falls below the fourth threshold value (Y), the difference between the angles is attributed to phase error. The methodology advances to 168, where the difference is added to an accumulated sum. The methodology then advances to 162, where a next pixel within the video frame is selected for evaluation. The methodology then returns to 152 to evaluate the new pixel.

Returning to 152, when it is determined that a selected pixel represents the start of a new frame (Y), the methodology advances to 172, where the accumulated sum is used to drive a phase locked loop (PLL) to generate a phase offset for an associated demodulation system. The phase offset value corrects the demodulation system for the determined color phase error within the signal. The accumulated sum is reset to zero at 174, and the system returns to 154 to evaluate the selected pixel for the next frame.

Figure 5:
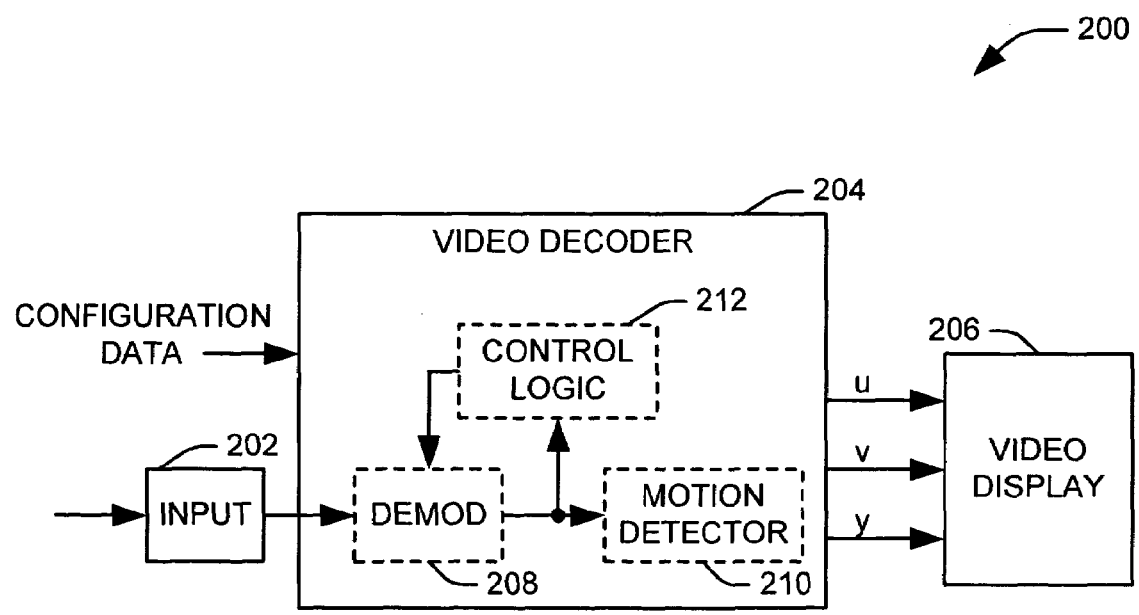
FIG. 5 illustrates a functional block diagram of a video system.

FIG. 5 illustrates a functional block diagram of a video system 200. It will be appreciated that the illustrated video system 200 is provided solely for the purpose of example, and that color phase error correction in accordance with one or more aspects of the present invention can be used in a variety of video systems. In the illustrated implementation, a composite video signal is applied to an input terminal 202 and supplied to video decoder 204. The video decoder decodes the input signal into a format recognizable by the system 200 and provides it a video display 206, such as may be visible to a user.

The video decoder 204 can include a demodulator 208 that produces a plurality of baseband chroma signals representing respective video frames from the composite video signal. These chroma signals are then provided to a motion detector 210 that compares the chroma signals representing the various frames and quantifies the interframe motion within the composite video signal as a motion parameter. This motion parameter can be provided as control data to one or more other components within the video system 200 that may be sensitive to motion within the composite video signal.

In accordance with an aspect of the present invention, the demodulator 208 can include one or more programmable components responsive to configuration data from an operator. For example, the demodulator 208 can include control logic 212 for compensating for color phase error within the demodulated signals. This control logic can be programmed by an operator to change various parameters associated with the compensation process, such as thresholds associated with pixel selection. Similarly, the motion detector 210 can include internal control logic that adjusts the motion detector output according to one or more characteristics of the input signal (e.g., signal jitter).

The control logic associated with the demodulator 208 and the motion detector 210 can be adjusted to adapt the video decoder 204 to a desired application. In accordance of an aspect of the invention, a human operator can evaluate the performance of the video system 200, and reconfigure the demodulator 208 and the motion detector 210 to improve the appearance of the displayed video. Accordingly, standard components can be utilized for a number of applications, with appropriate configuration data being provided to optimize its performance for a given application. The decoder can implement color phase correction, such as described herein, such that two or more sets of chroma components are utilized to generate color phase correction. The video display 206 can display a signal represented by one set or a combination of two or more sets of the chroma components and an associated luma component.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A video decoder system, comprising:
   a demodulator system that demodulates a composite video input signal to produce at least baseband chroma components based on a phase correction value; and
   color phase correction logic that determines the phase correction value based upon characteristics of the baseband chroma components associated with a series of at least two consecutive frames.

2. The system of claim 1, the color phase correction logic being operative to determine a difference in angle between a first vector defined by a set of chroma components associated with a given pixel in a first frame and a second vector defined by a set of chroma components associated with the given pixel in a second frame.

3. The system of claim 1, the color phase correction logic comprising a pixel evaluation component that selects a plurality of pixels associated with a given frame for evaluation according to at least one selection criteria.

4. The system of claim 3, the color phase correction logic calculating a first vector, having a first magnitude and a first phase angle, for a selected pixel in the given frame, and a second vector, having a second magnitude and a second phase angle, for a second pixel in a second frame, the color phase correction logic calculating an angular difference between the first phase angle and the second phase angle when the first pixel is selected for evaluation.

5. The system of claim 4, the at least one selection criteria further comprising at least one of:
   a comparison of luma values associated with a given pixel across at least two frames to determine if a luma value associated with a first of the at least two frame differs from a luma value associated with a second of the at least two frames by more than a first threshold value; and
   a comparison of the magnitude of the first vector and the magnitude of the second vector relative to a second threshold value.

6. The system of claim 3, the at least one selection criteria further comprising a comparison of chroma component values associated with a given pixel across at least two frames to determine if the chroma component values have changed by an amount greater than a threshold value.

7. The system of claim 3, the color phase correction logic further comprising an angle calculation component that determines the angular difference between a first vector defined by the chroma components associated with a given pixel in a first frame and a second vector defined by a set of chroma components associated with the given pixel in a second frame.

8. The system of claim 7, the color phase correction logic further comprising an accumulator that sums the determined angular difference across the plurality of selected pixels of at least one line of pixels to provide a summed angular difference.

9. The system of claim 8, further comprising a phase locked loop that is driven by the summed angular difference at the start of each frame to produce the phase correction value for the demodulator.

10. A method for correcting phase error in a video decoder system, comprising:
    demodulating an input signal to provide a first set of chroma components, representing a first frame, and a second set of chroma components, representing a second frame, for each of a plurality of pixels;
    generating a first vector from the first set of chroma components and a second vector from the second set of chroma components;
    selecting a subset of pixels according to at least one selection criteria;
    determining an angular difference between the first vector and the second vector for each of the selected subset of pixels; and
    summing the determined angular differences.

11. The method of claim 10, further comprising driving a phase locked loop with the summed angular differences to produce a phase offset value for an associated demodulation system.

12. The method of claim 10, further comprising rejecting a given selected pixel if the angular difference exceeds a threshold value.

13. The method of claim 10, wherein the selecting a subset of pixels further comprises rejecting a given pixel if the magnitude of the sum of the first vector and the second vector is less than a threshold value.

14. The method of claim 10, wherein the selecting a subset of pixels further comprises rejecting a given pixel if the difference between the magnitude of the first vector and the magnitude of the second vector is greater than a threshold value.

15. The method of claim 10, wherein the selecting a subset of pixels further comprises rejecting a given pixel if a luma value associated with the first frame differs from a luma value associated with the second frame by more than a threshold value.

16. A video system, comprising:
    a demodulator system that demodulates a composite video signal to produce a first set of chroma components, representing a first frame, and a second set of chroma components, representing a second frame;
    color phase correction logic that calculates a phase correction value for the demodulator system based upon characteristics of the first and second sets of baseband chroma components; and a video display, visible to a user, that displays a signal represented by at least the first set of chroma components and an associated luma component.

17. The system of claim 16, the color phase correction logic being operative to compute a difference in angle between a first vector defined by the first set of baseband chroma components and a second vector defined by the second set of baseband chroma components.

18. The system of claim 16, further comprising a luma-chroma separation system that filters the sets of baseband chroma components provided by the demodulator system to provide corrected chroma components.

19. The system of claim 16, the color phase correction logic having at least one programmable parameter.

20. The system of claim 16, the composite video signal being provided in a Phase Alternating Lines (PAL) format.

21. The system of claim 16, wherein the demodulator system demodulates the composite video signal to produce a third set of chroma components, representing a third frame, the color phase correction logic calculating a phase correction value for the demodulator system based upon characteristics of at least two of the first, second and third sets of chroma components.

* * * * *